UNITED STATES PATENT OFFICE.

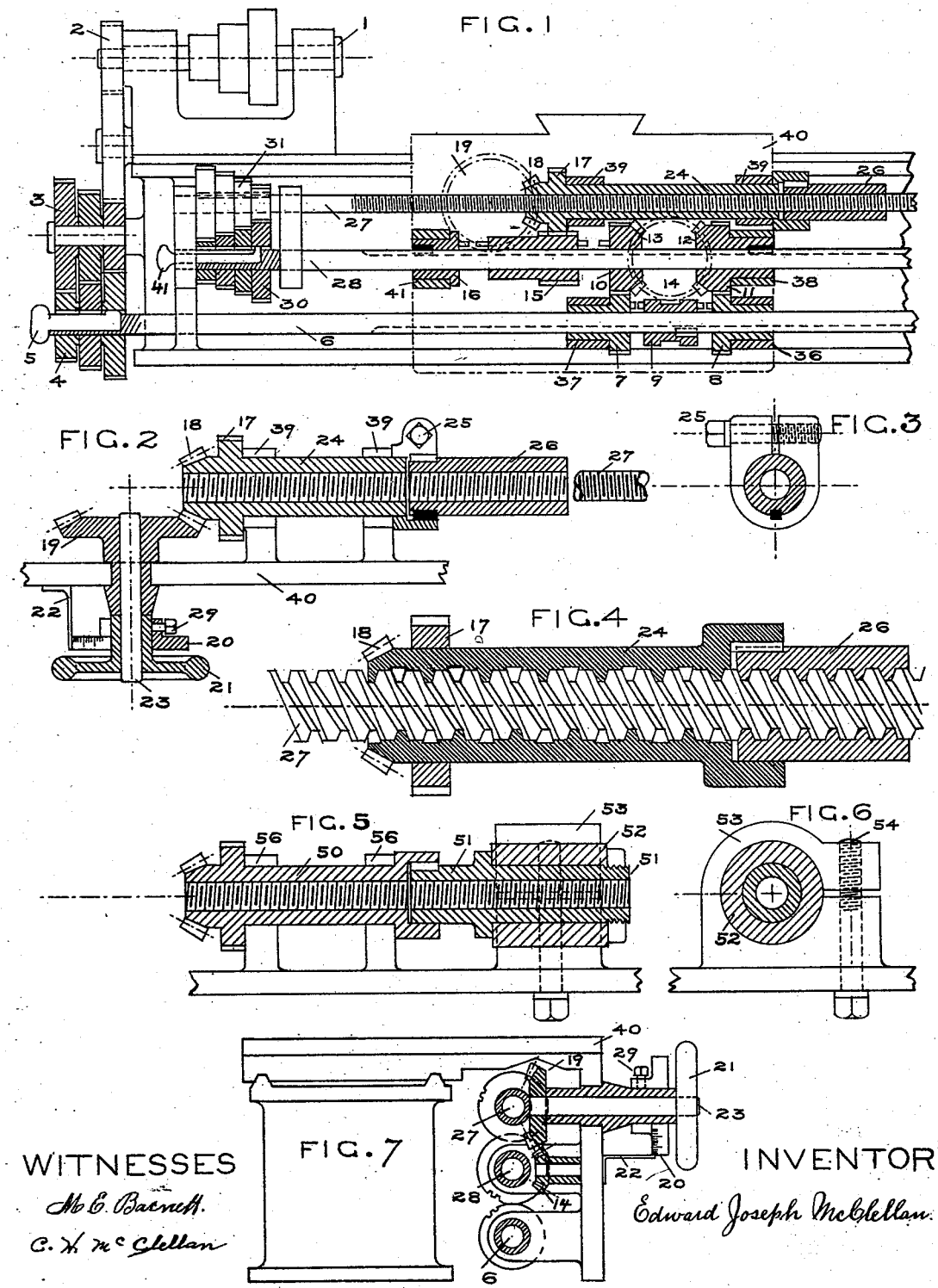

EDWARD JOSEPH McCLELLAN, OF NEW YORK, N. Y.

LATHE.

SPECIFICATION forming part of Letters Patent No. 572,709, dated December 8, 1896.

Application filed November 23, 1895. Serial No. 569,960. (No model.)

*To all whom it may concern:*

Be it known that I, EDWARD JOSEPH MC-CLELLAN, a citizen of the United States, residing at New York, in the county and State of New York, have invented an Improvement in Lathes, of which the following is a specification, reference being had to the accompanying drawings.

This invention is an improvement on the lathe with differential screw and nut for which I was granted Patent No. 533,997, dated February 12, 1895. In this lathe the feeding is done by rotary screw and nut, and the special features to which attention is called are the use of a double-thread screw with a rotary nut made in two portions, so that one thread of the screw and its corresponding nut can be reserved for screw-cutting, and a graduated hand-wheel connected with the rotary nut, so that distances can be read off without measuring the work.

Referring to the drawings, Figure 1 is a side elevation of the lathe. Fig. 2 is a plan view of the graduated hand-wheel and bevel-gears connected to the rotary nut and also shows the two portions of the rotary nut and the manner of connecting the two portions together. Fig. 3 is an end view of the rotary nut, showing the clamping-bolt. Fig. 4 is a sectional view of the rotary nut, showing how one of the threads of the double thread is cut away so as not to bear upon the feed-screw. This is done in one portion of the nut only. Fig. 5 is a plan, and Fig. 6 an end view, of the rotary nut, showing a different mode of connection for the two portions of the nut from that shown in Fig. 2. Fig. 7 is an end view of the lathe, showing the bed and carriage.

The spindle 1, carrying the gear 2, drives the shaft 6 through the medium of the two cones of gears 3 4, the latter having a sliding key 5, as commonly used in this connection. Loose on shaft 6 are the gears 7 8, with the clutch 9 between, the clutch 9 being keyed to the shaft 6. The gears 7 8 are carried along on the apron 40 by lugs 37 36. Connecting with the gears 7 8 are the gears 10 11, respectively. Fast on the gears 10 11 are the bevel-gears 13 and 12, which are connected by the bevel-gear 14. The gear 11 is keyed on the shaft 28, and the gear 10 is loose on the shaft 28. Loose on the shaft 28 is the pinion 15, which connects with the gear 17, which is solid on the rotary nut 24. Keyed on the shaft 28 and confined in the lug 41 is the bushing 16, and the bushing 16, pinion 15, and gear 10 are provided with one toothed clutch, as shown. Fast on the rotary nut 24, Fig. 2, is the bevel-pinion 18, which meshes with the bevel-gear 19. This bevel-gear 19 is fast on the shaft 23, which carries the hand-wheel 21. On the hub of the hand-wheel 21 is the adjustable dial 20, and connecting thereto is the pointer 22. The dial 20 is secured by the set-screw 29.

When the sliding pinion 15 is in the middle position, we can rotate the nut 24 by hand without rotating the screw 27 and all the intermediate gears. Leaving the sliding pinion 15 in the middle position and throwing in the clutch 9, we can get a quick traverse, or use the carriage as with an ordinary fixed nut-lathe by holding or clamping the hand-wheel 21 so it cannot turn.

The shaft 28 drives the screw 27 through the two cones of gears 30 31, which provide for changes of relative speed between the screw and the rotary nut thereon. The gears 30 are loose on the shaft 28 and have a sliding key 41, as shown. The gears 31 are all fast on the screw 27.

The rotary nut 24 runs in bearings 39, (see Fig. 2,) and this nut 24 has an enlarged head, into which fits the other part of the nut 26, and the two portions are clamped together by means of the bolt 25. The nut is cut for a double thread, and the nut 26 is complete, but the nut 24, as shown in section in Fig. 4, has one thread cut away, so as not to bear upon the feed-screw, and thus one thread of the screw is used by the nut 26 only, while the other thread of the screw is used by both nuts. The nut 26 is keyed in the nut 24, as shown, but is free to slide endwise in 24 except when clamped by the bolt 25. It will be seen that the nut 26 cannot exert any thrust except when clamped to the nut 24. The nut 24 is used the most, and hence will show the greatest wear, the nut 26 not being clamped to it except for screw-cutting. When the nuts are feeding along, not clamped together, the inequalities of movement due to differences of wear are provided for by sliding on each other, and when clamped together the nut 26 takes all the thrust, since it is the least worn and works on the thread of the screw reserved from the nut 24.

In Figs. 5 and 6 is shown a modification in the manner of connecting the auxiliary nut to take the thrust. In Fig. 2 the nut 24 is shouldered in lugs in the apron of the carriage, and the nut 26 feeds by being clamped to 24. In Fig. 5 the auxiliary nut feeds by being clamped direct to the apron independent of the main nut. In Fig. 5 the nut 50 is supported in lugs 56 and has an enlarged head, in which is keyed the nut 51 with freedom to slide. The nut 51 is shouldered in the bushing 52, which bushing 52 is supported and free to slide in the bearing 53 on the apron. The bearing 53 is split and can be clamped on the bushing 52 to prevent the sliding movement of same by means of the bolt 54.

It will be seen that the nut 51 takes no thrust until the bushing 52 is clamped, and then the nut 51 feeds the apron through the medium of the fixed bushing. In Fig. 5 the nut 51 can be clamped to feed in all positions and even when the lathe is running, while in Fig. 2 it is not convenient to connect the nut 26 except when the lathe is stopped and the nut 24 is in a certain position to get at the bolt 25. The nuts 26 and 51 are relatively the same.

It will be seen in following out the operation that throwing the clutch 9 from one gear to the other of the gears 7 and 8 reverses the motion of the screw 27 and the rotary nut 24, and thus reverses the feed of the carriage, and throwing the sliding pinion 15 into clutch with either the bushing 16 or the gear 10 makes the rotary nut 24 26 rotate in the same or opposite direction to that of the screw 27, as the case may be, and this action is explained in my previous patent before mentioned. These details have no particular bearing on the special points in question now. The dial 20 being fastened to the hand-wheel 21 by set-screw we can set the zero-point of the dial round to the pointer at any time, and supposing that the feed-screw is one-half inch pitch and the bevel-gears 18 19 are in the ratio of two to one it is clear that we can read off any number of inches and parts of an inch feed without applying a scale to the work.

By having the feed-screw made with double thread and using two nuts, one for each thread, as explained, we have virtually two screws, and can keep one in reserve for screw-cutting and preserve its accuracy, as is done with the screw in rack-feed lathes.

What I claim is—

1. In a lathe, the combination with a differentially-rotating screw and nut to feed the carriage of said lathe, and a graduated hand-wheel geared to said rotary nut for the purposes of measurement, substantially as described.

2. The combination in a lathe, of a rotary feed-nut made in two portions which are keyed together but free to slide on each other longitudinally, and a feed-screw, said nut being cut with a multiple thread and having one of the threads in one of the portions of the nut cut out so as not to bear upon the feed-screw, for the purposes substantially as described.

3. The combination in a lathe, of a carriage and a rotary nut carried thereon, said rotary nut being made in two portions which are keyed together but free to slide on each other longitudinally, said nut being cut with a multiple thread and having one of the threads in one of the portions of the nut cut out so as not to bear upon the feed-screw, and each portion of said nut being capable of being connected to effectively feed said carriage independently, for the purposes substantially as described.

4. The combination in a machine, of a feed-screw made with a multiple thread, and two feed-nuts fitted thereon, one of said nuts having one of the threads cut out so as not to bear upon the feed-screw, thus reserving one of the threads of the screw to the sole use of one of the nuts, for the purposes substantially as described.

5. The combination in a lathe, of a rotating feed-screw and a differentially-rotating nut thereon, to feed the carriage of said lathe, said screw being cut with a multiple thread, and said differentially-rotating nut being geared to a graduated hand-wheel and consisting of two portions keyed together but free to slide on each other longitudinally, and having one of the threads in one of the portions of said nut cut out so as not to bear upon the feed-screw, thus reserving one of the threads of the screw to the sole use of one of the nut portions, for the purposes substantially as described.

6. The combination in a lathe, of carriage 40, two rotary nuts 50 51 keyed together, sleeve 52 containing the nut 51, bearing 53 and binder-bolt 54, substantially as shown and described.

EDWARD JOSEPH McCLELLAN.

Witnesses:
C. H. McCLELLAN,
M. E. BARNETT.